Patented Aug. 3, 1943

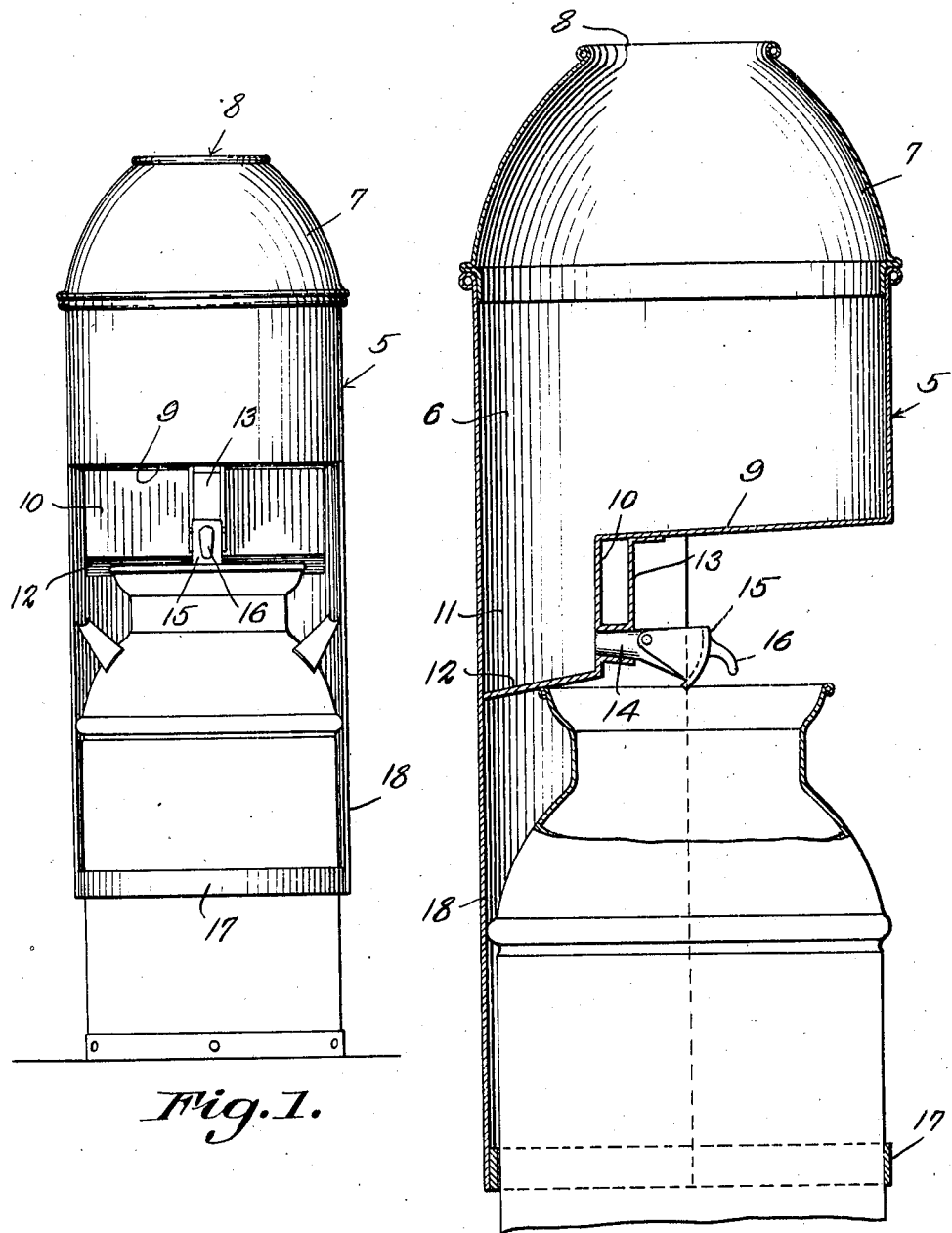

2,325,890

UNITED STATES PATENT OFFICE 2,325,890

DAIRY SEDIMENT TRAP

George King Thompson, Randolph, Ill.

Application August 17, 1940, Serial No. 353,144

2 Claims. (Cl. 210—57)

This invention relates to a device designed primarily for use by dairymen, and aims to provide novel means for removing foreign matter from milk which is of a higher specific gravity than milk, and which passes through the usual strainer cloth commonly used in straining milk for shipment by the producer.

An important object of the invention is to provide a device of this character having means for trapping certain foreign matter or sediment eliminating any possibility of the foreign matter finding its way into the cans in which the milk is shipped.

A still further object of the invention is to provide a device for transferring the milk to the shipping cans without danger of spilling the milk, the construction of the device being such that it may be readily cleaned and maintained in a sanitary condition.

With the foregoing and other objects in view, which will appear as the description proceeds, the invention resides in the combination and arrangement of parts and in the details of construction hereinafter described and claimed, it being understood that changes in the precise embodiment of the invention herein described, may be made within the scope of what is claimed, without departing from the spirit of the invention.

Referring to the drawing:

Figure 1 is an elevational view of a device constructed in accordance with the invention, a shipping can being shown as positioned under the device to receive milk therefrom.

Figure 2 is a longitudinal sectional view through the device.

Referring to the drawing in detail, the body portion of the device is indicated generally by the reference character 5, and as shown, includes a receiving compartment 6, the upper end thereof being partially closed by the removable dome-shaped cover 7 which is provided with an opening 8, through which the milk under treatment, is strained into the compartment. It will of course be understood that a suitable closure may be provided for the opening 8, to exclude foreign matter, when the device is not in use.

The inclined bottom 9 of the compartment is formed with a downwardly extended vertical wall 10 providing a precipitation chamber 11 which has a bottom 12 inclined rearwardly away from the front wall of the precipitation chamber.

A valve opening is formed in the front wall of the precipitation chamber 11, the opening being disposed slightly above the bottom 12, providing a space between the bottom 12 and valve opening, so that milk drawn from the device, will pass into the valve opening from a level above the bottom of the precipitation chamber insuring against sediment, which naturally gravitates to the bottom 12, of the precipitation chamber, from being carried off with the milk.

As shown, the front wall 10 of the precipitation chamber is braced by the wall 13 which extends upwardly from the faucet of the precipitation chamber and is secured to the bottom 9 of the compartment 6, as by welding or soldering.

The reference character 14 designates the faucet which is secured within the valve opening of the precipitation chamber and through which milk passes from the device. A pivoted closure indicated by the reference character 15, is normally closed by gravity, and operates to control the passage of milk from the device, there being provided a handle 16 whereby the valve may be readily raised to release the milk.

The device is supported over a receiving can, by means of the band 17 which is secured to the extension 18, formed integral with the body portion, the extension being curved to conform to the shape of the usual container or can, in which milk is usually shipped in bulk, to the end that the body portion is held in a rigid and upright position under the weight of the milk contained therein.

It will of course be understood that a milk pail may be positioned within the device for receiving the strained or purified milk, after it has passed through the device.

From the foregoing it will be seen that due to the construction shown and described, any foreign matter which may pass the usual strainer cloth or pad, when the milk is being transferred from the milkers' buckets to the compartment 6, will gravitate to the bottom of the precipitation chamber with the result that only the milk which is free of all foreign matter, will flow to the shipping cans, through the valve 14. It might be further stated that the compartment 6 is of a size to receive the contents of at least two buckets of milk, thereby allowing ample time for foreign matter to gravitate to a point where it will be trapped, before releasing the milk to the shipping can.

I claim:

1. A device for transferring milk to receptacles, comprising a body portion of a diameter equal to the diameter of the receptacle on which the device is positioned, and adapted to rest on the top of said receptacle into which milk is being transferred, a portion of the wall of the body portion extending downwardly an appreciable distance to engage the wall of the receptacle with which the body portion is used, a band secured to the lower end of the extension and adapted to encircle the receptacle, holding the body portion on the receptacle, and a spigot connected with the body portion through which milk flows from the body portion.

2. A device for transferring milk to a receptacle, comprising a body portion having a bottom, a portion of the bottom extending downwardly providing a precipitation chamber with the wall of the body portion, the bottom of the precipitation chamber being downwardly inclined towards the rear of the body portion, a valve extending into the wall of the precipitation chamber and through which material flows from the precipitation chamber, and the rear edge of the bottom of the precipitation chamber being disposed an appreciable distance below the valve providing a space for the collection of foreign matter, and means for supporting the body portion on a receptacle.

GEORGE KING THOMPSON.